(12) United States Patent
Norrman et al.

(10) Patent No.: US 11,252,561 B2
(45) Date of Patent: Feb. 15, 2022

(54) REFRESHING A SECURITY CONTEXT FOR A MOBILE DEVICE

(71) Applicant: TELEFONAKTIEBOLAGET LM ERICSSON (PUBL), Stockholm (SE)

(72) Inventors: Karl Norrman, Stockholm (SE); Gunnar Mildh, Sollentuna (SE); Oumer Teyeb, Solna (SE); Stefan Wager, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 133 days.

(21) Appl. No.: 16/616,050

(22) PCT Filed: Jun. 26, 2018

(86) PCT No.: PCT/IB2018/054704
§ 371 (c)(1),
(2) Date: Nov. 22, 2019

(87) PCT Pub. No.: WO2019/003106
PCT Pub. Date: Jan. 3, 2019

(65) Prior Publication Data
US 2020/0120499 A1    Apr. 16, 2020

Related U.S. Application Data

(60) Provisional application No. 62/524,812, filed on Jun. 26, 2017.

(51) Int. Cl.
*H04W 12/0431*    (2021.01)
*H04W 12/041*    (2021.01)

(52) U.S. Cl.
CPC ..... *H04W 12/0431* (2021.01); *H04W 12/041* (2021.01)

(58) Field of Classification Search
CPC .................. H04W 12/04031; H04W 12/0401
See application file for complete search history.

(56) References Cited

U.S. PATENT DOCUMENTS

| | | | | |
|---|---|---|---|---|
| 9,800,404 | B2 * | 10/2017 | Sedlacek | H04W 12/0431 |
| 10,158,625 | B2 * | 12/2018 | Liu | H04L 63/083 |
| 10,645,528 | B2 * | 5/2020 | Vrzic | H04W 40/00 |
| 10,813,160 | B2 * | 10/2020 | Xu | H04W 76/27 |

(Continued)

OTHER PUBLICATIONS

Huawei, "Summary of email discussion: [NBAH#04][NBIOT/Resume] RRC Functions for suspend-resume", 3GPP TSG-RAN WG2 Meeting #93, St. Julian's, Malta, Feb. 15-19, 2016, pp. 1-26, R2-161166, 3GPP.

(Continued)

*Primary Examiner* — Viral S Lakhia (57) ABSTRACT

A Radio Access Network (RAN) node instructs a wireless device having a connection to the RAN node to transition from a connected Radio Resource Control (RRC) state to an inactive RRC state in which key information supporting the connection, and a further connection to a Core Network (CN) node serving the wireless device, are maintained. Responsive to the wireless device returning to the connected RRC state, the RAN node requests new key material from the CN node, and replaces the key material supporting the connection with the new key material received from the CN node.

11 Claims, 8 Drawing Sheets

(56) References Cited

U.S. PATENT DOCUMENTS

| | | | | |
|---|---|---|---|---|
| 11,108,755 | B2* | 8/2021 | Sharma | H04W 12/0433 |
| 2012/0129499 | A1* | 5/2012 | Li | H04W 36/0038 |
| | | | | 455/411 |
| 2013/0114813 | A1* | 5/2013 | Chai | H04L 9/0891 |
| | | | | 380/270 |
| 2017/0055153 | A1* | 2/2017 | Fransen | H04W 12/069 |
| 2019/0191348 | A1* | 6/2019 | Futaki | H04W 36/0033 |
| 2019/0215686 | A1* | 7/2019 | Malkamaki | H04W 8/08 |
| 2019/0357122 | A1* | 11/2019 | Li | H04W 76/18 |
| 2020/0029211 | A1* | 1/2020 | Laselva | H04W 24/08 |

OTHER PUBLICATIONS

CATT, "Periodic RNA update procedure", 3GPP TSG-RAN WG2 Meeting #NR AH2, Qingdao, P.R. of China, Jun. 27-29, 2017, pp. 1-3, R2-1706409, 3GPP.

Ericsson, "Addressing key FFS in email discussion [98#30][NR] RRC Connection", 3GPP TSG-RAN WG2 #98-AH, Qingdao, P.R. of China, Jun. 27-29, 2017, pp. 1-3, R2-1707298, 3GPP.

Ericsson, "Security aspects of NB-IoT", 3GPP TSG-RAN WG2 NB-IOT Ad-hoc Meeting, Budapest, Hungary, Jan. 19-21, 2016, pp. 1-4, Tdoc R2-160476, 3GPP.

\* cited by examiner

REFRESHING A SECURITY CONTEXT FOR A MOBILE DEVICE

This application is a 371 of International Application No. PCT/IB2018/054704, filed Jun. 26, 2018, which claims the benefit of U.S. Provisional Application No. 62/524,812, filed Jun. 26, 2017, the disclosures of which are incorporated by reference herein in their entirety.

TECHNICAL FIELD

Embodiments of the present disclosure generally relate to the field of secure electronic communication, and more particularly to security key handling within a wireless communication network.

BACKGROUND

Security solutions for Long Term Evolution (LTE), Evolved Universal Terrestrial Radio Access Network (E-UTRAN), and Evolved Packet Core (EPC) include various functionalities for preventing security-related attacks. Some of this functionality is related to key handling in the User Equipment (UE) (e.g., wireless devices) and Radio Access Network (RAN). The key handling in the RAN is based on supporting both backward and forward security in relation to key handling.

Backward security relates to security designed to prevent attacks in which an attacker has obtained a user key (e.g., from a compromised node) and uses this key to decode recorded traffic sent/received earlier by the UE in previous nodes. Backwards security is supported by using a "one-way" key derivation function at every handover and state transition, making it computationally infeasible for the target node to derive any key used in the source node.

Forward security relates to security designed to prevent attacks in which an attacker has obtained a user key (e.g., from a compromised node) and uses this key to decode future traffic between the UE and future nodes. Forward security is supported in LTE RAN with help of the Core Network (CN) providing new key material (e.g., Next Hop key, NH) after handover and state transitions down to the RAN.

There currently exist certain challenges. Wireless technology is ever evolving, and is important that security solutions continue to protect traffic, even as new proposals and agreements are made that may change how security has been handled in the past (e.g., relative to how security is handled in current versions of LTE). In particular, security will continue to be an important consideration in 5G, New Radio (NR) and other emerging wireless communication contexts.

SUMMARY

It is an object of one or more embodiments herein to balance the security needs of the wireless network with computational efficiency principles. One or more embodiments herein thereby instruct a wireless device having a connection to the RAN node to transition from a connected Radio Resource Control (RRC) state to an inactive RRC state in which key material supporting the connection, and a further connection to a CN node serving the wireless device, are maintained, and request new key material from the CN node responsive to the wireless device returning to the connected RRC state. Such embodiments may enable the key material supporting the connection to be replaced by the new key material in a conscientious manner, e.g., by neither replacing the key material too frequently (and incurring unnecessary signaling and/or processing overhead) nor too infrequently (and potentially jeopardizing network security).

Accordingly, embodiments of the present disclosure include a method performed in a Radio Access Network (RAN) node. The method comprises instructing a wireless device having a connection to the RAN node to transition from a connected Radio Resource Control (RRC) state to an inactive RRC state in which key material supporting the connection, and a further connection to a Core Network (CN) node serving the wireless device, are maintained. The method further comprises, responsive to the wireless device returning to the connected RRC state, requesting new key material from the CN node. The method further comprises replacing key material supporting the connection with the new key material received from the CN node.

In some embodiments, replacing the key material supporting the connection with the new key material comprises providing the new key material to another RAN node.

In some embodiments, the method further comprises deriving a security key for the connection from the new key material. In at least one such embodiment, the method further comprises providing the security key for the connection to another RAN node to support connecting the wireless device to the other RAN node.

In any of the above embodiments, the new key material may comprise a next hop (NH) key, an NH chaining counter (NCC), or both. In some such embodiments, the new key material comprises the NCC, and the method further comprises sending the NCC to the wireless device. In some such embodiments, the new key material additionally or alternatively comprises the NH key, and the method additionally or alternatively further comprises refraining from sending the NH key to the wireless device.

In any of the above embodiments, requesting the new key material may comprise requesting the new key material in a path switch request.

Other embodiments include corresponding apparatus, systems, computer programs, computer readable storage mediums, carriers, and the like.

For example, embodiments include a RAN node configured to instruct a wireless device having a connection to the RAN node to transition from a connected RRC state to an inactive RRC state in which key material supporting the connection, and a further connection to a Core Network (CN) node serving the wireless device, are maintained. The RAN node is further configured to, responsive to the wireless device returning to the connected RRC state, request new key material from the ON node. The RAN node is further configured to replace the key material supporting the connection with the new key material received from the ON node.

In some such embodiments, the RAN node comprises a processor and a memory, the memory containing instructions executable by the processor whereby the RAN node is operative to perform any of the methods described herein. Such embodiments may additionally or alternatively comprise one or more physical units or functional modules of the RAN node configured to carry out particular aspects of certain embodiments.

Other embodiments of the present disclosure include a non-transitory computer readable medium storing a computer program product for controlling a programmable RAN node, the computer program product comprising software instructions that, when run on the programmable RAN node, cause the programmable RAN node to perform one or more of the methods described herein.

Yet further embodiments are included in the detailed description below.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a RAN node 100, generally, as opposed to discussion of particular instances of RAN nodes 100a, 100b)

DETAILED DESCRIPTION

Embodiments of the present disclosure are directed to security handling in a wireless communication network. Particular embodiments may be suitable for use in one or more Third Generation Partnership Project (3GPP) technologies, such as LTE, 5G, and/or NR. In particular, embodiments may, e.g., be suited to accommodating one or more proposals and/or agreements in the relevant 3GPP working group(s) for such technologies that might implicate or change how security is handled as compared to existing releases of LTE.

Figure 1:
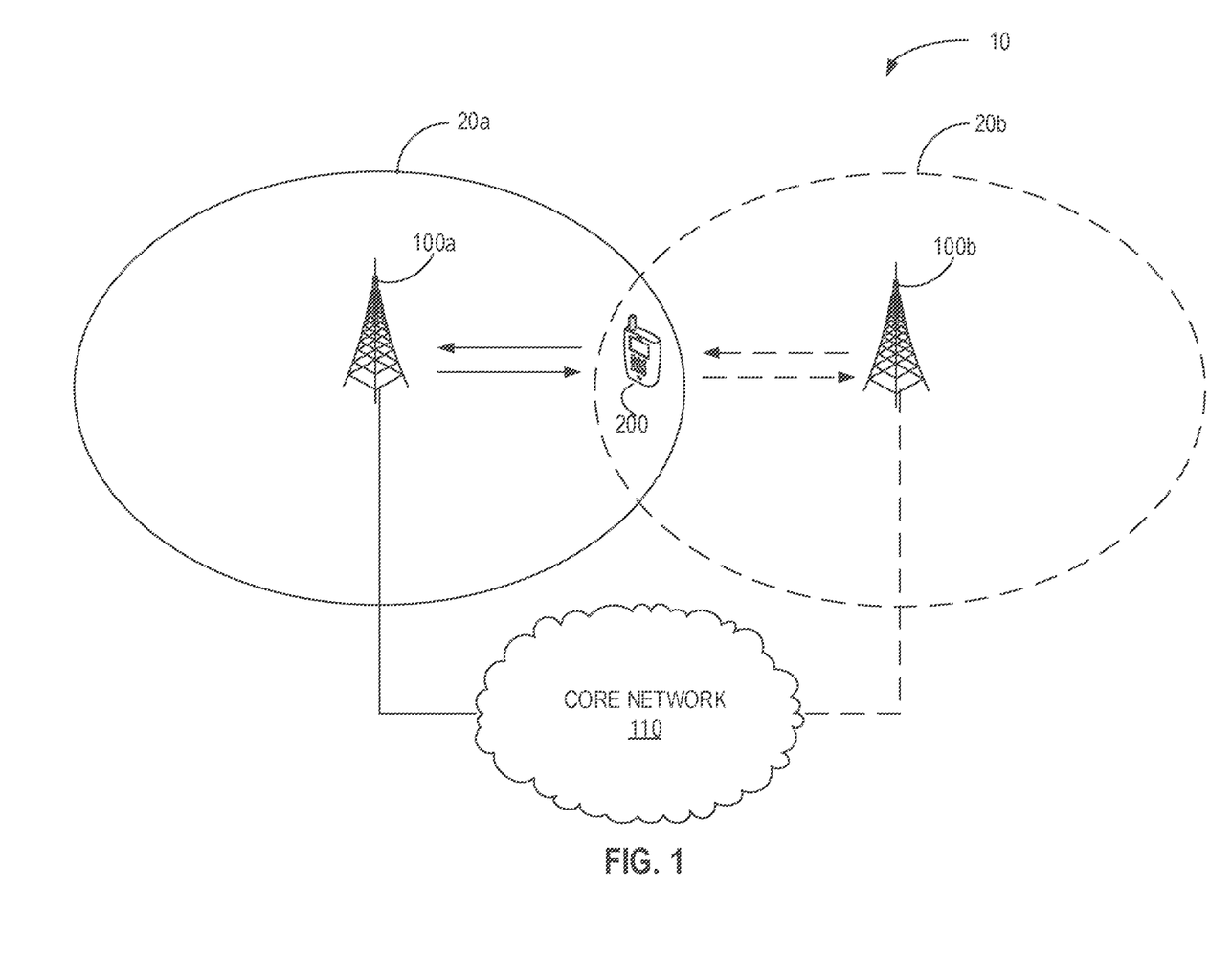
FIG. 1 is a block diagram illustrating an example wireless communication network, according to one or more embodiments of the present disclosure.

FIG. 1 illustrates communications between a RAN node 100a and a UE 200 in a wireless communication network 10, The RAN node 100a, sometimes referred to in applicable standards as an Evolved Node B (eNB), 5G Node B (gNB), or base station, provides radio coverage to the UE 200 in a cell 20a of the wireless communication network 10. With the support of the ON 110, the RAN node provides the UE 200 with an ability to communicate with other devices and/or the Internet, for example (not shown).

The UE 200 may comprise, for example, a cellular telephone, smart phone, laptop computer, notebook computer, tablet, machine-to-machine (M2M) communication device (also referred to as machine-type communication (MTC) device), and/or other device having wireless communication capabilities, ON 110 comprises at least one ON node (not shown in FIG. 1), such as a Mobility Management Entity (MME). An example of such a CN 110 may be an EPC (but is not limited thereto), The RAN node 100a and UE 200 communicate with each other over an air interface comprising an uplink (UL) and/or downlink (DL).

Particular embodiments of the wireless communication network 10 may include one or more additional RAN nodes (e.g., RAN node 100b), UEs (not shown), and/or cells (e.g., cell 20b). In particular, one or more RAN nodes 100 of the wireless communication system 20 may serve any number of cells 20 to any number of UEs 200, and any of the UEs 200 may handover between cells 20, whether served by the same RAN node 100a or different RAN nodes 100a, 100b, according to various embodiments. In some embodiments that include a plurality of RAN nodes 100a, 100b, the RAN nodes 100a, 100b may be connected to each other by an X2 interface (not shown).

A RAN node 100 may transmit data to the UE 200 on the DL using a Narrowband Physical Downlink Shared Channel (NPDSCH), a Narrowband Physical Downlink Control Channel (NPDCCH), and/or a Narrowband Physical Broadcast Channel (NPBCH). The UE 200 may transmit data to the RAN node 100 on the UL on a Narrowband Physical Uplink Shared Channel (NPUSCH). In particular, the RAN node 100 and UE 200 may be configured to operate on the air interface according to the 5G and/or NR standard, and communication over the air interface (e.g., over one or more radio bearers) may be cryptographically protected and/or checked for integrity by one or more keys. Such a key (or keys) may be derived from other keys stored at, e.g., the RAN node 100 and/or the CN 110 using a key derivation function.

Figure 2:
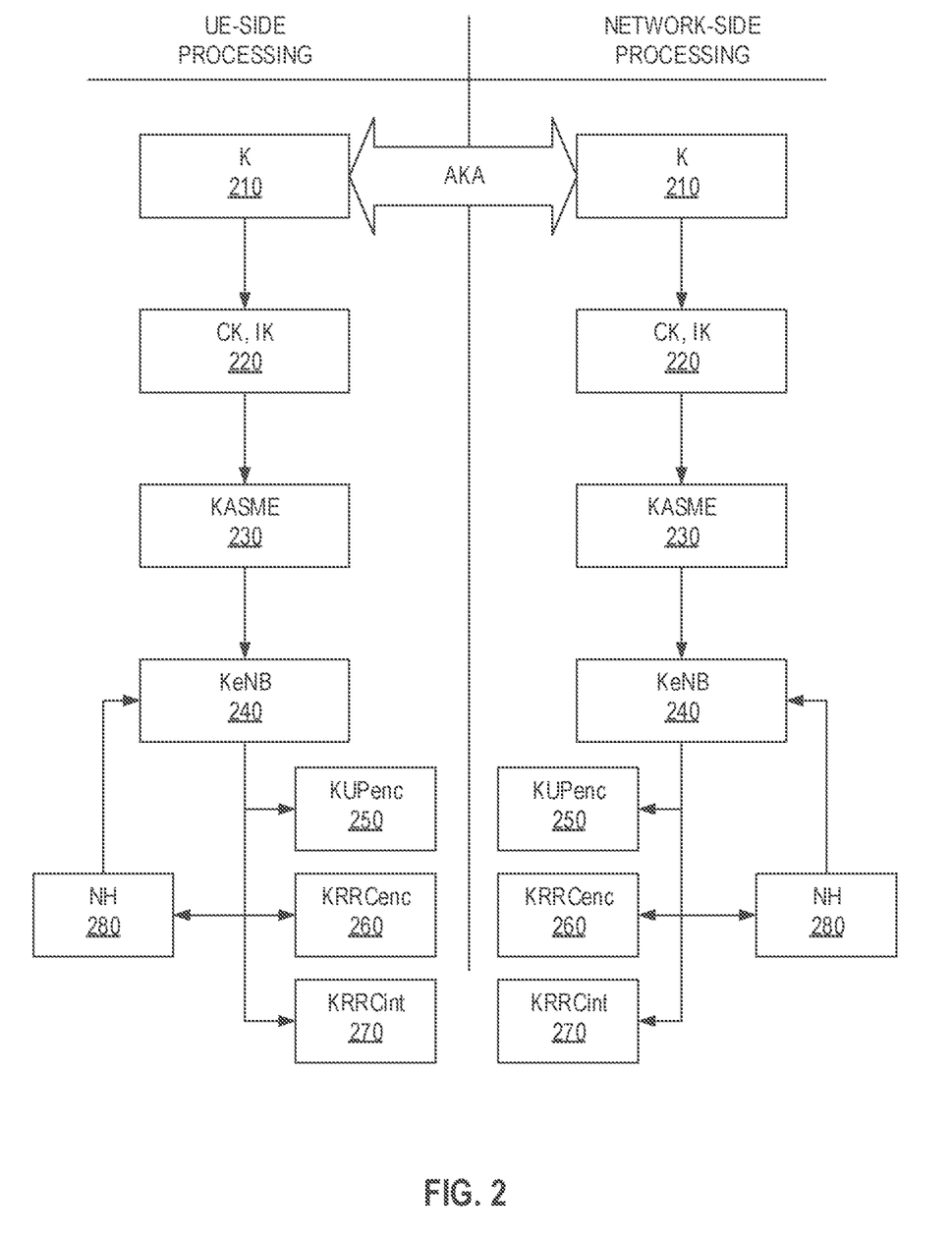
FIG. 2 is a block diagram illustrating an example key derivation hierarchy, according to one or more embodiments of the present disclosure.

FIG. 2 illustrates an example of key exchange and derivation processing as may be performed by the UE 200 and the network (e.g., a RAN node 100 and/or ON 110). The initial key K 210 may be programmed into a Universal Subscriber Identity Module (USIM) at the UE 200 and exchanged with the network using Authentication and Key Agreement (AKA) protocol. Once the UE 200 and the network both have the initial key K 210, each may derive subsequent keys used for various purposes, e.g., using a key derivation/generation function available to each that produces consistent results. In particular, from the initial key K 210, the UE 200 and the network may each derive a cryptographic key, CK, and integrity key, IK (collectively, 220). On the network side, the keys OK and IK 220 may be stored in a Home Subscriber Server (HSS), for example.

From the CK and IK key pair 220, the UE 200 and the network may each derive the key KASME 230, which may be a key that is particular to certain areas of the overall network (e.g., a home or visited network of the UE 200). On the network side, the key KASME 230 may be stored at a Mobility Management Entity (MME).

From the key KASME 230, the UE 200 and the network may each derive the key KeNB 240. In particular, when the UE 200 connects to the RAN node 100, the MME may derive an appropriate KeNB 240 and send it to the RAN node 100, for example.

From the key KeNB 240, the UE 200 and the network may each derive further keys, such as NH 280, KUPenc 250, KRRCenc 260, and KRRCint 270, e.g., for various security purposes relating to communication between the UE 200 and the RAN node 100. For example, the key NH 280 may be used for security during handover of the UE 200 between RAN nodes 110a, 110b. Further, the NH key 280 may be used to derive a new KeNB 240 or replace an existing KeNB 240 (e.g., for use in communication by/with the target RAN node 110b). Additionally or alternatively, the key KUPenc 250 may be used for user plane encryption, the key KRRCenc 260 may be used for Radio Resource Control (RRC) encryption, and the KRRCint 270 key may be used for integrity checking. Other embodiments may include additional or alternative key exchange and/or derivation processing features.

RRC is an air interface protocol used in certain 3GPP standards. The RAN node 100 and the UE 200 may use RRC for connection establishment and release functions, communicating (e.g., broadcasting) system information, establishing radio bearers, configuration/reconfiguration, connection mobility, paging notification, and/or other functions. According to the LTE standard, two general RRC modes are defined for a UE 200, namely, RRC_IDLE and RRC_CONNECTED.

Within the RRC_CONNECTED mode, a UE 200 transitions between further RRC states, such as CELL-DCH (Dedicated Channel), CELL_FACH (Forward Access Channel), CELL_PCH (Cell Paging Channel) and URA_PCH (UTRAN Registration Area, or URA, Paging Channel). In the RRC_IDLE state, a UE 200 is traditionally known to the CN 110, and has an IP address, but is not known/tracked by the RAN (E-UTRAN/eNB). The UE 200 may receive broadcast/multicast data (e.g., System Information); monitor a paging channel to detect incoming calls; perform neighbor cell measurements; and perform cell (re)selection. A UE 200 in RCC_IDLE may be configured by the network for Discontinuous Reception (DRX).

In traditional LTE, it is mandatory to change the security key of a UE 200 at every handover of that UE 200. In contrast, according to embodiments of the present disclosure, the network need not change the security key of a UE 200 when performing a handover inside the same RAN node 100. Rather, when to change the security key at handover may be a network decision.

Additionally or alternatively, embodiments of the present disclosure may include a new Radio Resource Control (RRC) state called RRC_INACTIVE in which the UE 200 is in a low power consuming state (e.g., sleep) and allowed to move over an area (e.g., RAN area) consisting of one or more cells 20 without notifying the network. According to such embodiments, the CN 110 may not be aware of whether the UE 200 is in the RRC_INACTIVE or RRC_CONNECTED state. Accordingly, the CN/RAN connection for a UE 200 in the RRC_INACTIVE state may be maintained as RRC_CONNECTED.

In the RRC_INACTIVE state, the UE 200 is neither connected to the RAN node 100 (in the sense that it has established data radio bearers), nor is it in the idle state since the RAN node 100 and UE 200 still keep track of their connection state. In particular, the RAN node 100 and the UE 200 keep the security context for RAN security. This is in contrast to when the UE 200 enters the idle state, where both the RAN node 100 and UE 200 delete the entire RAN security context. Significantly, when the UE 200 transitions from inactive to connected state, an attacker who has gained access to the RAN security context may be able to continue eavesdropping on the user's traffic. This is not the case when the UE 200 transitions from idle to connected state, as this transition results in a new RAN security context being derived from the Core network security context shared between the UE 200 and the Mobility Management Entity (MME) (not shown) of the ON 110. Therefore, by transitioning to inactive state instead of idle state, the RAN security context is likely to be available in the RAN node 100, and be used, for longer periods of time as compared to LTE.

For example; a RAN node key (KeNB) may be sent from the ON 110 to the RAN node 100 when the UE 200 enters the connected state (e.g., during RRC connection), and the RAN node 100 may derive new keys therefrom, e.g., for the UE 200. Although new keys are derived quite frequently in the RAN based on keys received from the ON 110 according to legacy LTE (e.g., after an inter-eNB handover, at RRC_IDLE to RRC_ACTIVE transitions); a UE 200 that enters an RRC_INACTIVE state without the RAN node 100 knowing may have an impact on the security threat model. For example, a UE 200 may seldom go to the RRC_IDLE state, and hence Access Stratum (AS)-level keys may not be refreshed from the CN 110 as frequently as in legacy LTE. This increases the value of AS-level keys for an attacker. Further, there is a risk that the same key will be used in the RAN for a longer time and possible over a larger set of cells 20 or RAN nodes 100, making it more likely that an attacker may obtain such a key.

Although embodiments of the present disclosure do not update the RAN security context on every handover, the security context may be updated, e.g., when the target RAN node 110b is in a different security domain than the source RAN node 110a. Accordingly, a KeNB (for example) may be kept over certain handovers (HOs). In some embodiments, this may provide adequate security while improving efficiency over legacy LTE approaches (e.g., by not requiring a key change for all handovers, but instead only under circumstances where such is needed for security purposes). Although, as compared to LTE, the RAN security context is available in more functions (and possibly on more platforms) according to such embodiments, this is not necessarily a problem, e.g., with an appropriate key change policy.

Initial releases of LTE only used one RAN security context per UE 200 and RAN node 100. This ensured compartmentalization, should a RAN node 100 be compromised. Embodiments of the present disclosure support Dual Connectivity (DC), in which a UE 200 may be connected to a master base station (e.g., RAN node 100a) and a secondary station (e.g., RAN node 100b), e.g., for pure NR access, for mixed LTE and NR accesses, or mixed access via other radio access technologies (RATs). In some such embodiments, the UE 200 shares a RAN security context with the master RAN node, and from this RAN security context, a secondary RAN security context may be derived which is then shared between the UE 200 and the secondary RAN node. In some such embodiments, due to the way the RAN security context is derived for the secondary RAN node, if the master RAN node is compromised by an attacker, that attacker may have sufficient information with which to eavesdrop on the traffic between the UE 200 and the secondary RAN node. That said, the converse is not true (i.e., compromising the secondary RAN node would not permit an attacker to eavesdrop on the master RAN node). Appropriately managed, this concept may not impose a grave risk. Notwithstanding, such is a step away from the strict compartmentalization of RAN security contexts that were present in the initial release of LTE.

That said, in some embodiments of the present disclosure, the master RAN node and the secondary RAN node may change or exchange roles. If security is not handled with care, the RAN security context for the new master RAN node may be derived from information available only in the RAN, such that the new master RAN node will have sufficient information on the RAN security context shared between the UE 200 and the new secondary RAN node, and vice versa. Should several role changes occur without the UE 200 going to idle state in between, all involved RAN nodes may, in theory, have full information about each other's RAN security contexts (e.g., old unused security contexts and new ones alike).

In view of the considerations above, solutions proposed herein include mechanisms that enable the RAN to request new key material from the ON 110 (e.g. NH key, NH chaining counter) even when there is no handover or state transition between IDLE (RRC_IDLE) and ACTIVE (RRC_CONNECTED) states. The new key material may then be applied during subsequent handovers or state transitions been RRC_INACTIVE and RRC_CONNECTED. In some particular embodiments, the RAN may refresh keys at regular intervals or at special events even in the case of a UE 200 that is stationary in the same RAN node and does not enter RRC_IDLE. The UE 200 may know when to use the new keys based on the network providing the NCC (Next hop Chaining Counter) to the UE 200, In some such embodiments, when the NCC has incremented, the UE 200 derives a new key from the "master" key stored in the UE 200 and CN 110 (e.g. the base key, KASME). The NCC may be provided to the UE 200 in a handover command or in a message ordering the UE 200 to enter RRC_INACTIVE.

Figure 3:
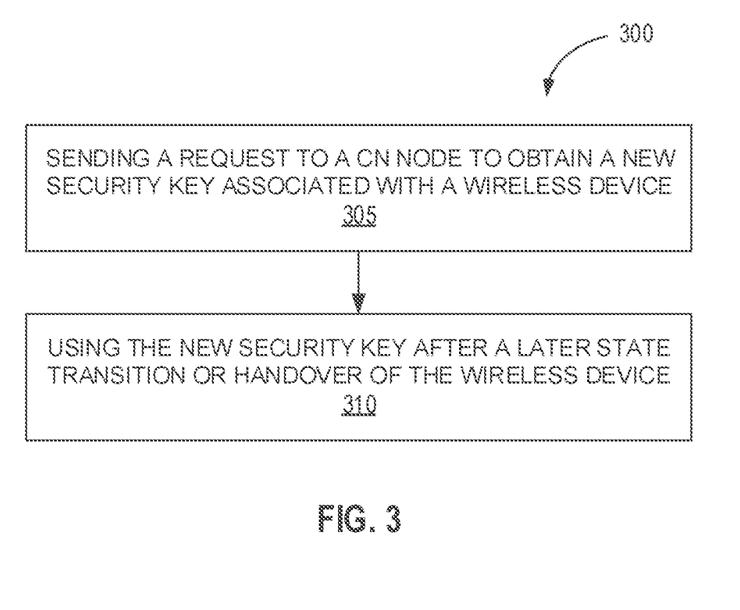
FIG. 3 is a flow diagram of an example method, according to one or more embodiments of the present disclosure.

Thus, according to certain embodiments, a method 300 is disclosed, e.g., as illustrated in FIG. 3. The method 300 is performed in a RAN node 100a. The method 300 comprises sending a request to a ON node to obtain a new security key associated with a wireless device 200 (block 305). The method 300 further comprises using the new security key after a later state transition or handover of the wireless device 200 (block 310). According to certain embodiments, using the new security key comprises deriving a further new security key to be used by the RAN node 100a, e.g., for secure communication between the RAN node 100a and the wireless device 200. Additionally or alternatively, using the new security key may comprise deriving a further new security key to be used by another RAN node 100b, e.g., for secure communication between the other RAN node 100b and the wireless device 200. Additionally or alternatively, using the new security key comprises sending the new security key to another RAN node 100b.

Certain embodiments may provide one or more of the following technical advantages. For instance, certain embodiments allow the network to refresh one or more keys when needed from a security point of view. The key refresh may rely on new key material stored in the UE 200 and ON 110 to prevent attackers who have obtained the old AS key (e.g., KeNB) to continue to eavesdrop or in otherwise compromise the connection between the UE 200 and RAN node 100. Furthermore, certain embodiments create a good balance between security needs and the use of extra computational resources and/or signaling (e.g., as compared to legacy LTE where the key is refreshed at every handover and state transition, which involves signaling and additional user plane functions). According to various embodiments disclosed herein, the key does not need to be refreshed from CN key material at every handover or state transition but can be refreshed as needed. Certain embodiments may provide some, none, or all of these benefits. Other technical benefits may be apparent to those of skill in the art.

Other embodiments are contained within the scope of the subject matter disclosed herein. Indeed, the disclosed subject matter should not be construed as limited to only the embodiments set forth herein. Rather, these embodiments are provided by way of example to convey the scope of the subject matter to those skilled in the art.

For example, as stated above, the RAN can obtain new security keys from the ON 110 according to legacy LTE during a Path Switch procedure (which is triggered by RAN after an X2 handover), in the Handover Request message used for S1 handover, or in the S1 connection Suspend Message and Resume Message (which is used for the Rel-13 solutions for RRC suspend/resume).

The key is provided in a Security Context Information Element (IE). The purpose of the Security Context IE is to provide security related parameters to the RAN node 100, which are used to derive security keys for user plane traffic and RRC signaling messages and for security parameter generation for subsequent X2 or intra RAN Node 100 handovers, or for the security parameters for the current S1 Handover.

For intra LTE S1 Handover one pair of {NCC, NH key} is provided for 1-hop security. According to embodiments, NCC may, for example, be an integer between zero and seven (inclusive) that takes the value zero at initial setup, and/or increment in response to certain network events. NH 280 is a security key that, together with the NCC, may be used to derive a security configuration for use in communication between the RAN node 110 and UE 200. In particular, for inter RAT Handover, the NH 280 may be the KeNB 240 to be used in the new configuration.

Figure 4:
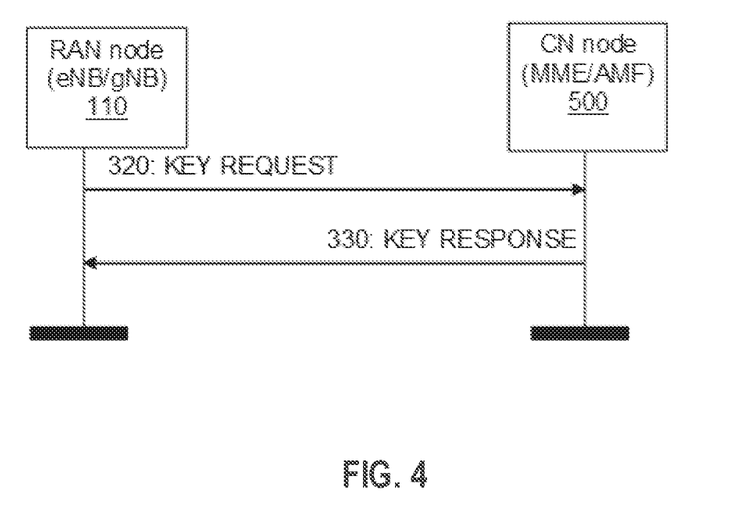
FIG. 4 is a signaling diagram illustrating example communications between a RAN node and a ON node, according to one or more embodiments of the present disclosure.

The procedures discussed above may be triggered by an event (e.g., incoming handover, S1 suspend/resume, etc.). In order to allow the RAN to request a new NH key 280 at any time, embodiments of the present disclosure include a new procedure, as shown in FIG. 4. According to the example shown in FIG. 4, a RAN node 110 (e.g., eNB, gNB, or similar node) submits a key request to a CN node 500 (e.g., MME, Authentication Management Field (AMF), or similar) (step 320). In response, the ON node 500 sends a key response to the RAN node 110 (step 330).

Additionally or alternatively, the RAN may send a PATH SWITCH REQUEST to a CN node 500 even when the RAN node 110 used by the user equipment 200 is not changing. A PATH SWITCH REQUEST is a message that is sent by the RAN node 110 to request the MME (or other ON Node 500) to switch the DL General Packet Radio Service (GPRS) tunneling protocol (GTP) tunnel termination point(s) from one end-point to another. In some embodiments, the PATH SWITCH REQUEST may use the same Transport Network Layer (TNL) address and GTP Tunnel Endpoint Identifier (TEID) as a traditional PATH SWITCH REQUEST.

Figure 5:
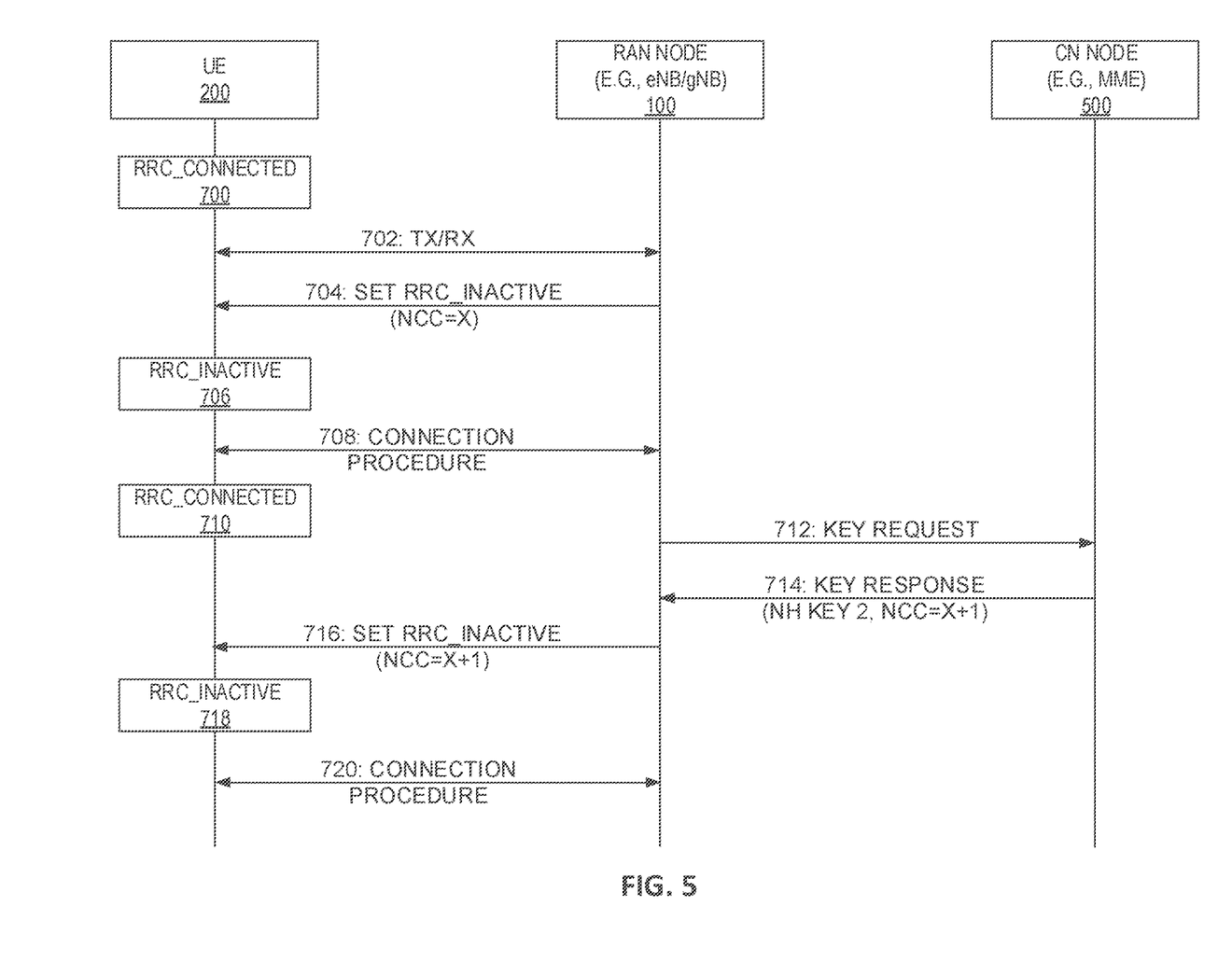
FIG. 5 is a signaling diagram illustrating an example of key handling according to one or more embodiments of the present disclosure.

In view of the above, embodiments of the present disclosure may include a UE 200, RAN node 100, and/or ON Node 500 acting in accordance with the example flow illustrated in FIG. 5. According to the example of FIG. 5, a new NH key may be independently created by the UE 200 and the network to support derivation of new security contexts used to support transition of the UE 200 to the RRC_CONNECTED state.

As shown in FIG. 5, the UE 200 in the RRC_CONNECTED state (step 700) sends and/or receives data or signaling (step 702). Subsequently, the UE 200 becomes inactive, and the RAN node decides to order the UE to RRC_INACTIVE state (step 704). In the command that orders the UE 200 to the RRC_INACTIVE state, the NCC parameter (value X) is provided indicating that the next time the UE 200 enters RRC_CONNECTED it should derive a new security key based on the NH key (referred to as NH key 1, in this example). Correspondingly, the serving RAN node 100 has the NH key 1 already stored.

In response to the command from the RAN node 100, the UE 200 enters the RRC_INACTIVE state (step 706). Later, UL data arrives in the UE 200 to be transmitted on the UL, and in response, the UE 200 initiates the procedure to transition to RRC_CONNECTED (i.e., to communicate data on the UL to the RAN node 100) (step 708). As part of this procedure, the UE 200 derives a new security key based on the NH key 1.

During the time the UE is in the RRC_CONNECTED state (step 710), the RAN node 100 triggers a procedure to fetch a new NH key (NH key 2) from the CN Node 500. The procedure may include the RAN node 100 sending a request (step 712) for the new NH key (NH key 2) and receiving NH key 2 from the CN Node 500 in response (step 714).

Once again, the UE 200 becomes inactive, and the RAN node 100 decides to order the UE 200 to the RRC_INACTIVE state (step 716). In the command that orders the UE 200 to enter the RRC_INACTIVE state, the NCC parameter (value X+1) is provided, indicating that the next time the UE 200 enters RRC_CONNECTED it should derive another security key based on NH key 2. Accordingly, the UE 200 enters RRC_INACTIVE state (step 718).

Later, UL data again arrives in the UE 200 and the UE 200 initiates the procedure to transition to RRC_CONNECTED (step 720). As part of this procedure, the UE 200 derives a new security key based on NH key 2.

Figure 6:
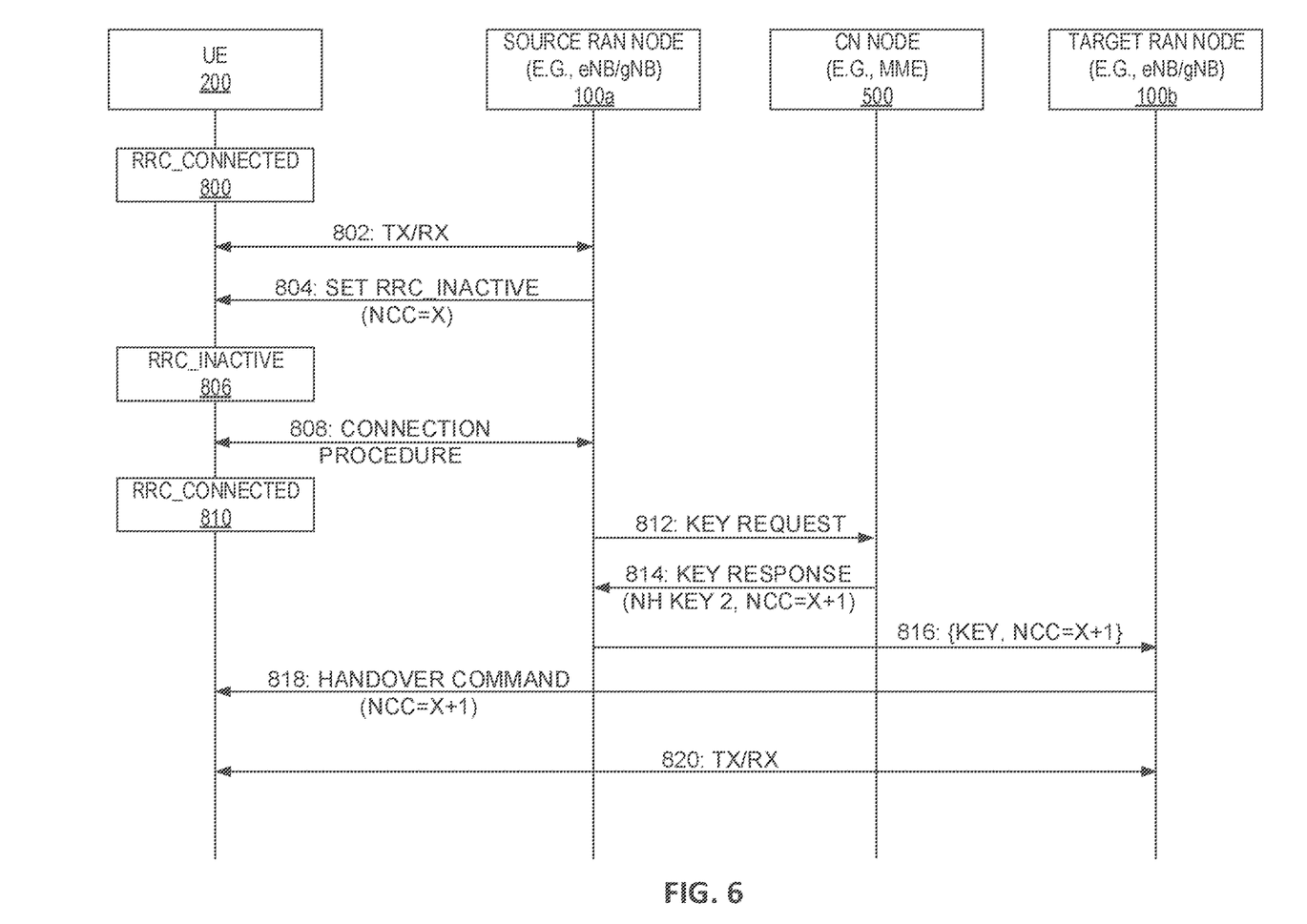
FIG. 6 is a signaling diagram illustrating another example of key handling according to one or more embodiments of the present disclosure.

Other embodiments of the present disclosure may include a UE 200, source RAN node 100a, target RAN node 100b, and/or CN Node 500 acting in accordance with the example flow illustrated in FIG. 6. The example illustrated in FIG. 6 may be used, e.g., to handover the UE 200 from the source RAN node 100a to a target RAN node 100b.

As shown in FIG. 6, the UE 200 in the RRC_CONNECTED state (step 800) sends and/or receives data or signaling (step 802). Subsequently, the UE 200 becomes inactive, and the RAN node 100a decides to order the UE 200 to the RRC_INACTIVE state (step 804). In the command that orders the UE 200 to the RRC_INACTIVE state, the NCC parameter (value X) is provided indicating that the next time the UE 200 enters RRC_CONNECTED it should derive a new security key based on the NH key (referred to as NH key 1, in this example). Correspondingly, the serving RAN node 100a has the NH key 1 already stored.

In response to the command from the serving RAN node 100a, the UE 200 enters the RRC_INACTIVE state (step 806). Later, UL data arrives in the UE 200 to be transmitted on the UL, and in response, the UE 200 initiates the procedure to transition to RRC_CONNECTED (i.e., to communicate data on the UL to the RAN node 100a) (step 808). As part of this procedure, the UE 200 derives a new security key based on the NH key 1.

During the time the UE is in the RRC_CONNECTED state (step 810), the RAN node 100a triggers a procedure to fetch a new NH key (NH key 2) from the CN Node 500. The procedure may include the RAN node 100a sending a request (step 812) for the new NH key (NH key 2) and receiving NH key 2 from the CN Node 500 in response (step 814).

The need subsequently arises to handover the UE 200 to a new RAN node 100b. In response, the source RAN node 100a provides the target RAN node 100b with a key derived from the NH key 2 (or the NH key 2 itself) as well as the NCC parameter (step 816). The target RAN node 100b generates and sends a handover command to the UE 200. The handover command that orders the UE 200 to handover to a cell served by the target RAN node 100b comprises the NCC parameter (value X+1) indicating that the UE 200 should derive the key needed for the target cell based on the NH key 2 (step 818). In accordance with the handover command, the UE 200 arrives in the target cell, and is able to exchange data and/or signaling with the target RAN node 100b (step 820).

Figure 7:
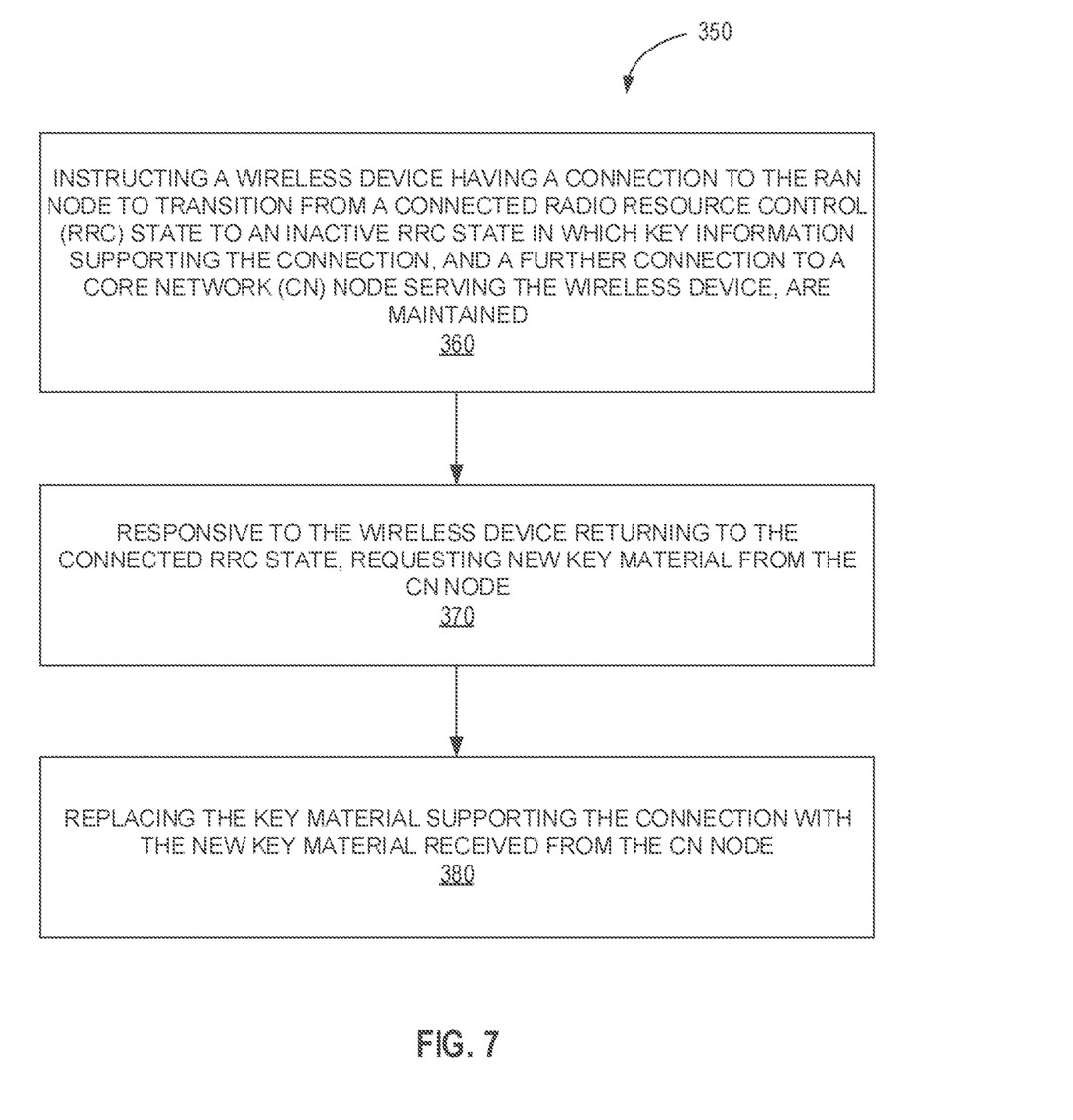
FIG. 7 is a flow diagram of another example method, according to one or more embodiments of the present disclosure.

Thus, in view of the above, embodiments of the present disclosure include, e.g., a method 350, as illustrated in FIG. 7. The method 350 is performed in a RAN node 100a. The method 350 comprises instructing a wireless device 200 having a connection to the RAN node 110a to transition from a connected Radio Resource Control (RRC) state to an inactive RRC state in which key material supporting the connection, and a further connection to a CN node 500 serving the wireless device 200, are maintained (block 360). The method 350 further comprises, responsive to the wireless device 200 returning to the connected RRC state, requesting new key material from the CN node 500 (block 370). The method further comprises replacing key material supporting the connection with the new key material received from the ON node 500 (block 380).

The methods described above are used for exemplary purposes, and it will be appreciated that in certain embodiments, some steps may be omitted, combined, or performed in different order. In some particular embodiments, the procedures described above may, e.g., similarly be applied for intra-RAN node handover. In such embodiments, the keys may be used internally in the RAN node 100a.

Although the subject matter described herein may be implemented in any appropriate type of system using any suitable components, the embodiments disclosed herein are described in relation to a wireless network 10. Such a wireless network 10 may further include any additional elements suitable to support communication between wireless devices 200 or between a wireless device 200 and another communication device, such as a landline telephone, a service provider, or any other network node or end device. The wireless network 10 may provide communication and other types of services to one or more wireless devices 200 to facilitate the wireless devices' access to and/or use of the services provided by, or via, the wireless network 10.

The wireless network 10 may comprise and/or interface with any type of communication, telecommunication, data, cellular, and/or radio network or other similar type of system. In some embodiments, the wireless network 10 may be configured to operate according to specific standards or other types of predefined rules or procedures. Thus, particular embodiments of the wireless network 10 may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

As used herein, network node refers to equipment capable, configured, arranged and/or operable to communicate directly or indirectly with a wireless device 200 and/or with other network nodes or equipment in the wireless network 10 to enable and/or provide wireless access to the wireless device 200 and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network 10 or to provide some service to a wireless device 200 that has accessed the wireless network 10.

Figure 8:
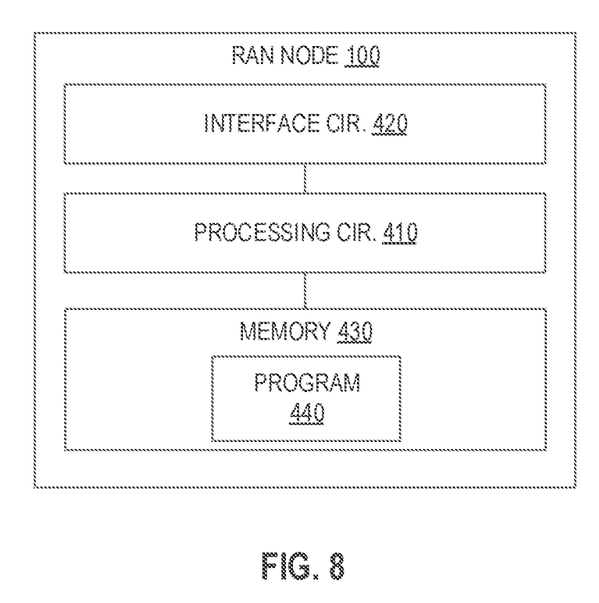
FIG. 8 is a block diagram illustrating an example RAN node, according to one or more embodiments of the present disclosure.

In view of all of the above, embodiments of the present disclosure include a RAN node 100, such as that illustrated in FIG. 8. The RAN node 100 comprises processing circuitry 410, as well as interface circuitry 420 and memory 430 that are each communicatively coupled to the processing circuitry 410. The processing circuitry 410 is configured to perform one or more of the methods disclosed herein (e.g., method 300 and/or method 350 discussed above). In some embodiments, the processing circuitry 410 is configured by executing a computer program 440 stored in the memory 430. The interface circuitry 420 is configured to exchanging signals with the UE 200 and/or a CN node 500.

Figure 9:
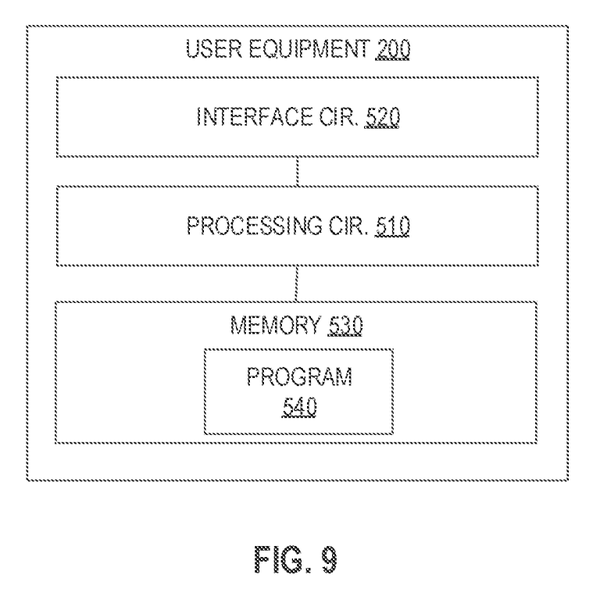
FIG. 9 is a block diagram illustrating an example UE, according to one or more embodiments of the present disclosure.

According to additional embodiments, a UE 200 (e.g., as shown in FIG. 9) and corresponding UE method are also disclosed to co-operate with the RAN node 100, as discussed above. The UE 200 comprises processing circuitry 510, as well as interface circuitry 520 and memory 530 that are each communicatively coupled to the processing circuitry 510. The processing circuitry 510 may be configured to perform one or more of the methods described herein by executing a computer program 540 stored in the memory 530.

Figure 10:
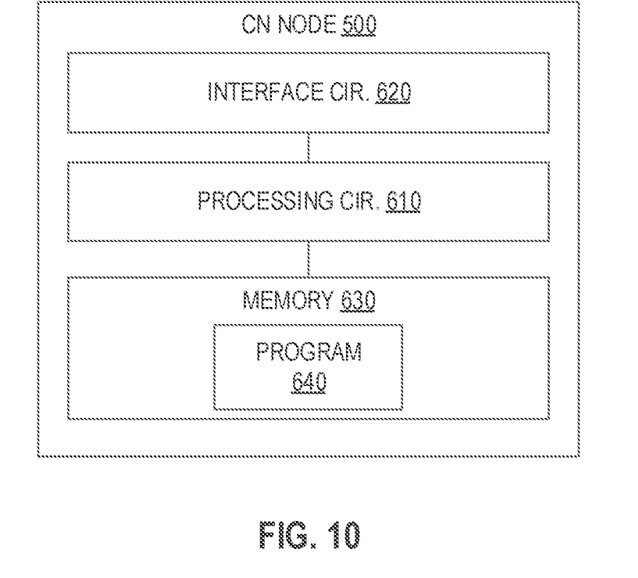
FIG. 10 is a block diagram illustrating an example ON node, according to one or more embodiments of the present disclosure.

According to yet further embodiments, a ON node 500 (e.g., as shown in FIG. 10) and corresponding ON node method are also disclosed to co-operate with the RAN node 100, as discussed above. The ON node 500 comprises processing circuitry 610, as well as interface circuitry 620 and memory 630 that are each communicatively coupled to the processing circuitry 610. The processing circuitry 610 may be configured to perform one or more of the methods described herein by executing a computer program 640 stored in the memory 630.

As used herein, a UE 200 refers to a wireless device capable, configured, arranged and/or operable to communicate wirelessly with network nodes and/or other wireless devices. Unless otherwise noted, the term UE 200 may be used interchangeably herein with wireless device. Communicating wirelessly may involve transmitting and/or receiving wireless signals using electromagnetic waves, radio waves, infrared waves, and/or other types of signals suitable for conveying information through air. In some embodiments, a UE 200 may be configured to transmit and/or receive information without direct human interaction. For instance, a UE 200 may be designed to transmit information to a network on a predetermined schedule, when triggered by an internal or external event, or in response to requests from the network. Examples of a UE 200 include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (OPE), a vehicle-mounted wireless terminal device, etc. A UE 200 may support device-to-device (D2D) communication, for example by implementing a 3GPP standard for sidelink communication, and may in this case be referred to as a D2D communication device. As yet another specific example, in an Internet of Things (IoT) scenario, a UE 200 may represent a machine or other device that performs monitoring and/or measurements, and transmits the results of such monitoring and/or measurements to another UE 200 and/or a network node. The UE 200 may in this case be a machine-to-machine (M2M) device, which may in a 3GPP context be referred to as a machine-type communication (MTC) device. As one particular example, the UE 200 may implement the 3GPP narrow band Internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a UE 200 may represent a vehicle or other equipment that is capable of monitoring and/or reporting on its operational status or other functions associated with its operation. A UE 200 as described above may represent the endpoint of a wireless connection, in which case the device may be referred to as a wireless terminal. Furthermore, a UE 200 as described above may be mobile, in which case it may also be referred to as a mobile device or a mobile terminal.

Although the RAN node 100 illustrated in the example of FIG. 8, the UE 200 illustrated in the example of FIG. 9, and the ON node 500 illustrated in the example of FIG. 10 may represent respective devices that include the illustrated combination of hardware components, other embodiments may comprise different combinations of components. It is to be understood that each of these devices may comprise any suitable combination of hardware and/or software needed to perform the tasks, features, functions and methods disclosed herein. Moreover, while the components of these devices are depicted as single boxes located within a larger box, or nested within multiple boxes, in practice, either or both of the devices may comprise multiple different physical components that make up a single illustrated component (e.g., the memory 430, 530, 630 of one or more of these devices may comprise multiple separate hard drives as well as multiple Random Access Memory (RAM) modules).

The processing circuitry 410, 510, 610 of one or more of these devices may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node components, such as memory 430, 530, 630 and interface circuitry 420, 520, 620. In some embodiments, processing circuitry 410, 510, 610 may include a system on a chip (SOC). In alternative embodiments, some or all of the functionality of either device may be provided by processing circuitry 410, 510, 610 without executing instructions stored on a separate or discrete device readable medium, such as in a hard-wired manner. In any of those embodiments, whether executing instructions stored on a device readable storage medium or not, the processing circuitry of one or more of these devices 410, 510, 610 can be configured to perform the described functionality.

In some embodiments, the interface circuitry 420, 520, 620 of one or more of these devices may include one or more of radio frequency (RF) transceiver circuitry and baseband processing circuitry. In some embodiments, radio frequency (RF) transceiver circuitry and baseband processing circuitry may be on separate chips (or sets of chips), boards, or units, such as radio units and digital units. In alternative embodiments, part or all of RF transceiver circuitry and baseband processing circuitry may be on the same chip or set of chips, boards, or units. In some embodiments, the interface circuitry 420, 520, 620 of one or more of these devices may be comprised in their respective processing circuitry 410, 510, 610.

The memory 430, 530, 630 of one or more of these devices may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 410, 510, 610. Memory 430, 530, 630 may store any suitable instructions, data or information, including a computer program, software, an application including one or more of logic, rules, code, tables, etc. and/or other instructions capable of being executed by its corresponding processing circuitry 410, 510, 610. Memory 430, 530, 630 may be used to store any calculations made by its corresponding processing circuitry 410, 510, 610 and/or any data received via its corresponding interface circuitry 420, 520, 620. In some embodiments, the processing circuitry 410, 510, 610 and its corresponding memory 430, 530, 630 may be considered to be integrated. The processing circuitry 410, 510, 610 of one or more of these devices may, accordingly, implement one or more physical units and/or functional modules.

Figure 11:
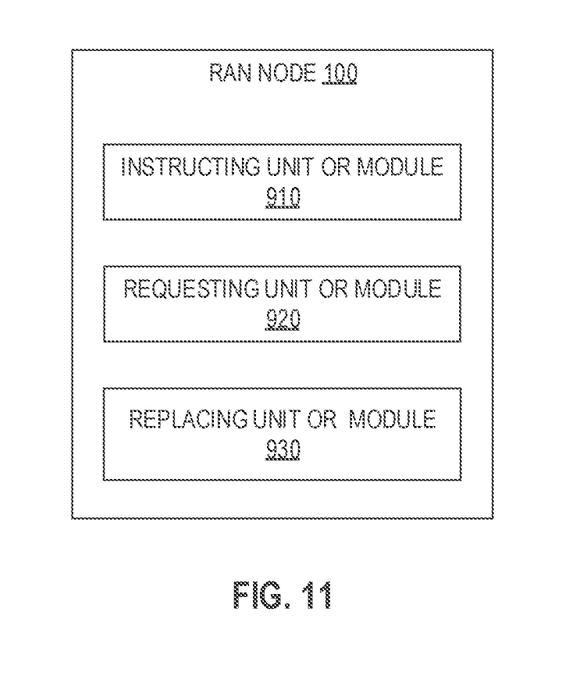
FIG. 11 is a block diagram illustrating another example RAN node, according to one or more embodiments of the present disclosure.

FIG. 11, in this regard, illustrates a RAN node 100 in accordance with one or more embodiments. As shown, the RAN node 100 includes an instructing unit or module 910, a requesting unit or module 920, and a replacing unit or module 930. The instructing unit or module 910 is configured to instruct a wireless device 200 having a connection to the RAN node 100a to transition from a connected RRC state to an inactive RRC state in which key material supporting the connection, and a further connection to a CN node 500 serving the wireless device 200, are maintained. The requesting unit or module 230 is configured to, responsive to the wireless device 200 returning to the connected RRC state, request new key material from the ON node 500. The replacing unit or module 240 is configured to replace the key material supporting the connection with the new key material received from the ON node 500.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed in a Radio Access Network (RAN) node, the method comprising:
   instructing a wireless device having a connection to the RAN node to transition from a connected Radio Resource Control (RRC) state to an inactive RRC state in which key material supporting the connection, and a further connection to a Core Network (CN) node serving the wireless device, are maintained;
   responsive to the wireless device returning to the connected RRC state, requesting new key material from the CN node;
   replacing the key material supporting the connection with the new key material received from the CN node;
   deriving a security key for the connection from the new key material; and
   providing the security key for the connection to another RAN node to support connecting the wireless device to another RAN node.

2. The method of claim 1, wherein the new key material comprises a next hop (NH) key, an NH chaining counter (NCC), or both.

3. The method of claim 2, wherein the new key material comprises the NCC, and the method further comprises sending the NCC to the wireless device.

4. The method of claim 2, wherein the new key material comprises the NH key, and the method further comprises refraining from sending the NH key to the wireless device.

5. The method of claim 1, wherein requesting the new key material comprises requesting the new key material in a path switch request.

6. A Radio Access Network (RAN) node comprising:
   a processor and a memory, the memory containing instructions executable by the processor, whereby the RAN node is operative to:
   instruct a wireless device having a connection to the RAN node to transition from a connected Radio Resource Control (RRC) state to an inactive RRC state in which key material supporting the connection, and a further connection to a Core Network (CN) node serving the wireless device, are maintained;
   responsive to the wireless device returning to the connected RRC state, request new key material from the CN node;
   replace the key material supporting the connection with the new key material received from the CN node;

derive a security key for the connection from the new key material; and provide the security key for the connection to another RAN node to support connecting the wireless device to another RAN node.

7. The RAN node of claim 6, wherein the new key material comprises a next hop (NH) key, an NH chaining counter (NCC), or both.

8. The RAN node of claim 7, wherein the new key material comprises the NCC, and wherein the RAN node is further operative to send the NCC to the wireless device.

9. The RAN node of claim 7, wherein the new key material comprises the NH key, and wherein the RAN node is further operative to refrain from sending the NH key to the wireless device.

10. A non-transitory device-readable medium having stored thereon instructions that, when executed by processing circuitry of a computing device, cause the computing device to perform operations comprising:

instructing a wireless device having a connection to a Radio Access Network (RAN) node to transition from a connected Radio Resource Control (RRC) state to an inactive RRC state in which key material supporting the connection is maintained;

responsive to the wireless device returning to the connected RRC state, requesting new key material from a Core Network (CN) node;

replacing the key material supporting the connection with the new key material received from the CN node;

deriving a security key for the connection from the new key material; and providing the security key for the connection to another RAN node to support connecting the wireless device to another RAN node.

11. The non-transitory device-readable medium of claim 10, wherein the new key material comprises a next hop (NH) key, an NH chaining counter (NCC), or both.

* * * * *